(12) United States Patent  (10) Patent No.: US 7,735,230 B2
Barany  (45) Date of Patent: Jun. 15, 2010

(54) HEAD-MOUNTED NAVIGATION SYSTEM

(75) Inventor: Laszlo Barany, Camarillo, CA (US)

(73) Assignee: NOVATAC, Inc., Carlsbad, CA (US)

( * ) Notice: Subject to any disclaimer, the term of this patent is extended or adjusted under 35 U.S.C. 154(b) by 427 days.

(21) Appl. No.: 11/424,506

(22) Filed: Jun. 15, 2006

(65) Prior Publication Data

US 2007/0227020 A1 Oct. 4, 2007

Related U.S. Application Data

(60) Provisional application No. 60/786,909, filed on Mar. 29, 2006.

(51) Int. Cl.
*G01C 17/00* (2006.01)
(52) U.S. Cl. .............. 33/354; 33/1 CC; 33/333
(58) Field of Classification Search ............... 33/354, 33/1 CC, 300, 301, 315, 333, 334, 348, 363 R
See application file for complete search history.

(56) References Cited

U.S. PATENT DOCUMENTS

| | | | | |
|---|---|---|---|---|
| 2,803,068 A | * | 8/1957 | Mason | 33/348 |
| 3,475,957 A | * | 11/1969 | Hiszpanski | 33/333 |
| 3,798,527 A | | 3/1974 | Du Plessix et al. | |
| 3,888,500 A | * | 6/1975 | Gauthier | 33/333 |
| 3,978,591 A | * | 9/1976 | Jaaskelainen | 33/334 |
| 4,006,397 A | | 2/1977 | Catotti et al. | |
| 4,283,798 A | * | 8/1981 | Kuehn | 33/333 |
| 4,722,601 A | | 2/1988 | McFarlane | |
| 4,843,300 A | | 6/1989 | Alderman | |
| 5,106,179 A | * | 4/1992 | Kamaya et al. | 351/158 |
| 5,162,828 A | * | 11/1992 | Furness et al. | 353/122 |

| | | | |
|---|---|---|---|
| 5,254,929 A | | 10/1993 | Yang |

(Continued)

FOREIGN PATENT DOCUMENTS

GB 2416208 1/2006

(Continued)

OTHER PUBLICATIONS

Philips Semiconductors. Discrete Semiconductors. Data Sheet for KMZ51 Magnetic Sensor. Product specification dated Jun. 13, 2000.

*Primary Examiner*—Christopher W Fulton
(74) *Attorney, Agent, or Firm*—Coastal Patent, LLC; Joshua S. Schoonover

(57) ABSTRACT

A head-mounted navigation system may include an image sensor configured to sense one or more objects forward of a person and to generate image information representative of the one or more objects. A bearing sensor may be included and configured to detect bearing and to generate bearing information representative of the bearing. Securing apparatus may be included and configured to secure the bearing sensor to the person. The securing apparatus may be configured to secure the bearing sensor to the torso of the person, such as to his or her back. A processing system may be included and configured to receive the image information and/or the bearing information and to generate display information representative of the one or more objects and/or the bearing. A display may be included and configured to receive the display information and to display visual information representative of the one or more objects and/or the bearing. Head gear may be included and configured to mount on the head of the person and to position the display along a sight path of the person.

30 Claims, 7 Drawing Sheets

U.S. PATENT DOCUMENTS

| | | |
|---|---|---|
| 5,313,712 A * | 5/1994 | Curameng et al. ............ 33/354 |
| 5,504,416 A | 4/1996 | Holloway et al. |
| 5,790,085 A | 8/1998 | Hergesheimer |
| 5,818,381 A | 10/1998 | Williams |
| 5,982,285 A | 11/1999 | Bueche et al. |
| 6,066,075 A | 5/2000 | Poulton |
| 6,144,187 A | 11/2000 | Bryson |
| 6,234,277 B1 | 5/2001 | Sun et al. |
| 6,326,771 B1 | 12/2001 | Popescu-Stanesti |
| 6,351,110 B1 | 2/2002 | Pappalardo et al. |
| 6,417,797 B1 | 7/2002 | Cousins et al. |
| 6,421,031 B1 * | 7/2002 | Ronzani et al. ................ 345/8 |
| 6,803,746 B2 | 10/2004 | Aker |
| 6,917,370 B2 | 7/2005 | Benton |
| 6,930,608 B2 | 8/2005 | Grajales et al. |
| 2002/0114982 A1 | 8/2002 | Putt et al. |
| 2003/0231001 A1 | 12/2003 | Bruning |
| 2005/0130682 A1 | 6/2005 | Takara et al. |
| 2005/0167590 A1 | 8/2005 | Miyano et al. |
| 2006/0001382 A1 | 1/2006 | Nomoto |

FOREIGN PATENT DOCUMENTS

| | | |
|---|---|---|
| JP | 51-140775 | 12/1976 |
| JP | 2005 324566 | 11/2005 |

\* cited by examiner

HEAD-MOUNTED NAVIGATION SYSTEM

CROSS-REFERENCE TO RELATED APPLICATION

This application is based upon and claims priority to U.S. Provisional Application Ser. No. 60/786,909, entitled "Smoke-Penetrating Imaging Helmet," filed Mar. 29, 2006. The entire content of this provisional application is incorporated herein by reference.

BACKGROUND

1. Field

Navigation systems and, more particularly, navigation systems that assist individuals in navigating through environments having poor visibility.

2. Description of Related Art

There are numerous situations in which an individual needs to navigate through environments that have poor visibility. These include environments that contain smoke, dust, fog, snow, sand, rain, flames, and/or are poorly lit.

Firefighters are an example. They often need help walking through smoke or fire-filled rooms for self rescue, such as when trying to locate exits, obstacles and/or other dangers. They also often need help locating persons needing to be rescued.

Military personnel are another example. They may need assistance running or walking on a smoke-filled battlefield or traveling through a smoke-filled room filled to rescue a hostage or to capture or incapacitate an enemy.

Police are a still further example. They may similarly need assistance traveling through a smoke-filed filled room to rescue a hostage or to capture or incapacitate a criminal.

It may be impractical for these individuals to carry heavy or bulky equipment to assist in their effort. It may also be costly to purchase expensive navigation equipment for a large number of them.

SUMMARY

A head-mounted navigation system may include an image sensor configured to sense one or more objects forward of a person and to generate image information representative of the one or more objects. A bearing sensor may be included and configured to detect bearing and to generate bearing information representative of the bearing. Securing apparatus may be included and configured to secure the bearing sensor to the person. A processing system may be included and configured to receive the image information and/or the bearing information and to generate display information representative of the one or more objects and/or the bearing. A display may be included and configured to receive the display information and to display visual information representative of the one or more objects and/or the bearing. Head gear may be included and configured to mount on the head of the person and to position the display along a sight path of the person.

The image sensor may include a radar sensor. The head gear may include a helmet, and the radar sensor may be attached to the helmet and include a beaming antenna and an antenna sweeping system configured to cause the beaming antenna to sweep horizontally. The beaming antenna may include a horn and the antenna sweeping system may include a motor mechanically linked to the horn. The beaming antenna may output a frequency-modulated continuous-wave signal. The frequency-modulated continuous-wave signal may have a wavelength of less than one millimeter.

The image sensor may be configured to generate image information that is representative of the range and reflectivity of each of the one or more objects.

The bearing sensor may include a magnetic field sensor.

The securing apparatus may be configured to secure the bearing sensor to the torso of the person, such as to the back of the person. The securing apparatus may include a clothing pocket.

The processing system may be configured to generate display information that is representative of a three-dimensional image of the one or more objects.

The processing system may be configured to generate bearing information that is representative of an image of a compass pointing in the direction of the bearing.

The processing system may be configured to generate bearing information that includes a numerical representation of the bearing.

The processing system may be configured to generate bearing information that is representative of the current bearing of the person relative to an earlier bearing of the person.

The display include may include an LCD.

The display may include LEDs.

The head gear may include a face mask.

The head gear may be configured to position all portions of the display above the horizontal line of sight of the person.

These, as well as other components, steps, features, objects, benefits, and advantages, will now become clear from a review of the following detailed description of illustrative embodiments, the accompanying drawings, and the claims.

DETAILED DESCRIPTION OF ILLUSTRATIVE EMBODIMENTS

Figure 1:
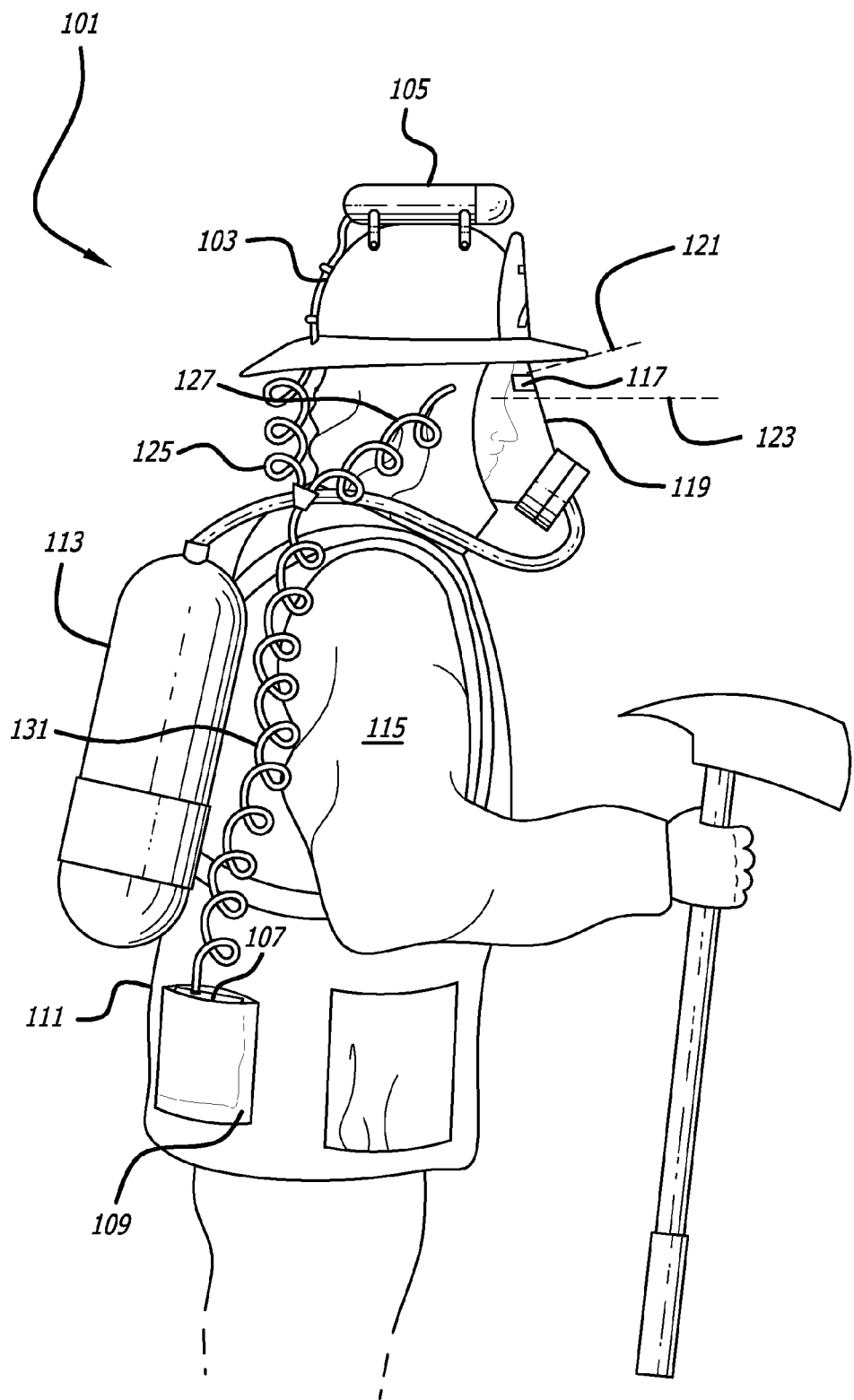
FIG. 1 illustrates a head-mounted navigation system worn by a firefighter.

FIG. 1 illustrates a head-mounted navigation system worn by a firefighter. As shown in FIG. 1, a firefighter 101 may be wearing a helmet 103 having an image sensor 105.

The image sensor 105 may function to sense one or more objects forward of the firefighter. It may generate information representative of the one or more objects, such as information concerning the range of each object from the firefighter and the degree to which the object reflects a signal that may be generated by the image sensor 105 and directed to the object.

Any type of image sensor may be used for the image sensor 105. It may be a radar sensor, an ultrasound sensor, an infrared sensor, another type of sensor, and/or any combination of these types of sensors.

The image sensor 105 may be attached to headgear worn by the firefighter, such as to the helmet 103. It may be attached to the top of the helmet, such as shown in FIG. 1. It may in addition or instead be placed in front of the helmet, to the side of the helmet, to a different portion of the headgear, to another area on the firefighter, and/or to a location that is external to the firefighter.

A housing 107 may contain a bearing sensor (not visible in FIG. 1) that may be configured to detect the bearing of the firefighter 101. The bearing sensor may also be configured to generate bearing information indicative of the bearing of the firefighter.

Any type of bearing-detecting device may be used for the bearing sensor. For example, the bearing sensor may include a magnetic field sensor that detects the orientation of the bearing sensor with respect to the earth's magnetic field. The magnetic sensor may be configured to minimize interference by stray magnetic fields, to balance for differences between magnetic north and true north, and/or to compensate for temperature effects. A chip bearing sold as part number KMZ51 may be obtained from Phillips to serve as the bearing sensor.

Other types of bearing sensors may be used in addition or instead, including a gyroscope and/or a GPS system. The bearing sensor may consist of a single sensor or may include several sensors.

Securing apparatus may be included to secure the bearing sensor to the firefighter. The securing apparatus may secure the bearing sensor to the torso of the firefighter, such as on the back of the firefighter. It may in addition or instead secure the bearing sensor to other areas of the firefighter, such as to a shoulder or thigh. The securing apparatus may in addition or instead secure the bearing sensor to the head of the firefighter. When secured to the head, however, the bearing that is sensed may be the direction in which the firefighter is looking, not necessarily the direction in which the firefighter is traveling.

Any type of securing apparatus may be used to secure the bearing sensor to the firefighter. The securing apparatus may be or may include a clothing pocket 109 attached to the rear portion of a jacket 111 that may be worn by the firefighter 101. The pocket 109 may be positioned so as to cause the housing 107 not to come in contact with an air tank 113 that may be worn by the firefighter or the firefighter's arm 115 when moved. Other types of securing apparatus may be used in addition or instead to secure the bearing sensor to the firefighter, such as a strap, clip, hook, and/or Velcro.

The head-mounted navigation system may include a display 117. The display may be of any type, such as an LCD. It may include or instead consist of one or more LEDs. Any other type of display may be used in addition or instead. The display 117 may have a single screen or multiple screens or no screen.

The headgear worn by the firefighter may include a face mask 119 to which the display 117 may be attached. The display 117 may be attached to the face mask 119 in such a position as to cause the display to lie along a sight path 121 of the firefighter 101. The display 117 may be positioned with respect to the face mask 119 such that all portions of the display lie above the horizontal line of sight 123 of the firefighter 101. This configuration is commonly referred to as a heads-up display.

The display 117 may be configured and/or positioned so as to be viewable by one or both of the firefighter's eyes.

The display 117 may be attached to portions of the headgear other than the face mask 119 to position it along a sight path of the firefighter 101. For example, the display 117 may be attached to the helmet 103. The display 117 may be attached to a cap, head strap, eyewear, or other type of headgear that the firefighter 101 might wear instead or in addition.

Flexible electric cabling 125,127, and 131 may be used to electrically interconnect the housing 107, the image sensor 105, and the display 117. Coiled cables may be used for this purpose, as shown in FIG. 1. The cabling may be constructed of material that withstands harsh environments, such as high temperature or caustic environments.

Unlike what is illustrated in FIG. 1, the cabling 125,127, and 131 may be configured or routed internally so as not to be exposed. The cabling may include appropriate end connectors, thus enabling the image sensor 105 and the display 117 to be detached from each other and from the housing 107. This may make it easier for the firefighter 101 to put on his protective gear.

In lieu of the cabling 125,127, and 131, the connections between the various components of the system may be wireless, using any of the well-know wireless techniques that are in use today or that are later be invented.

Figure 2A:
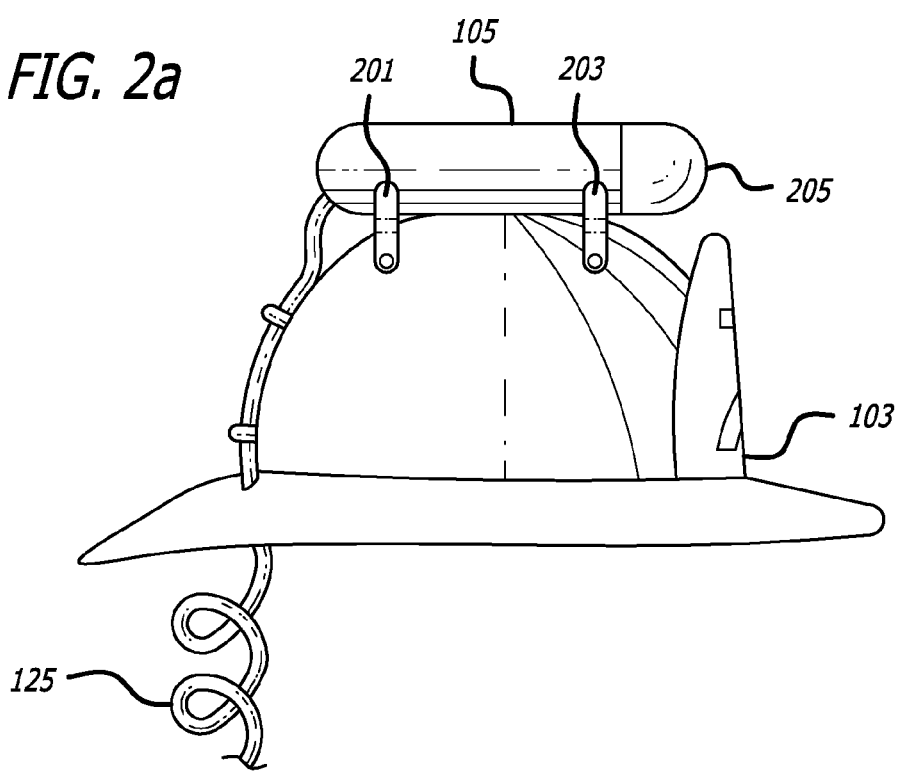
FIGS. 2(a) and (b) illustrate details of the helmet shown in FIG. 1.
Figure 2B:
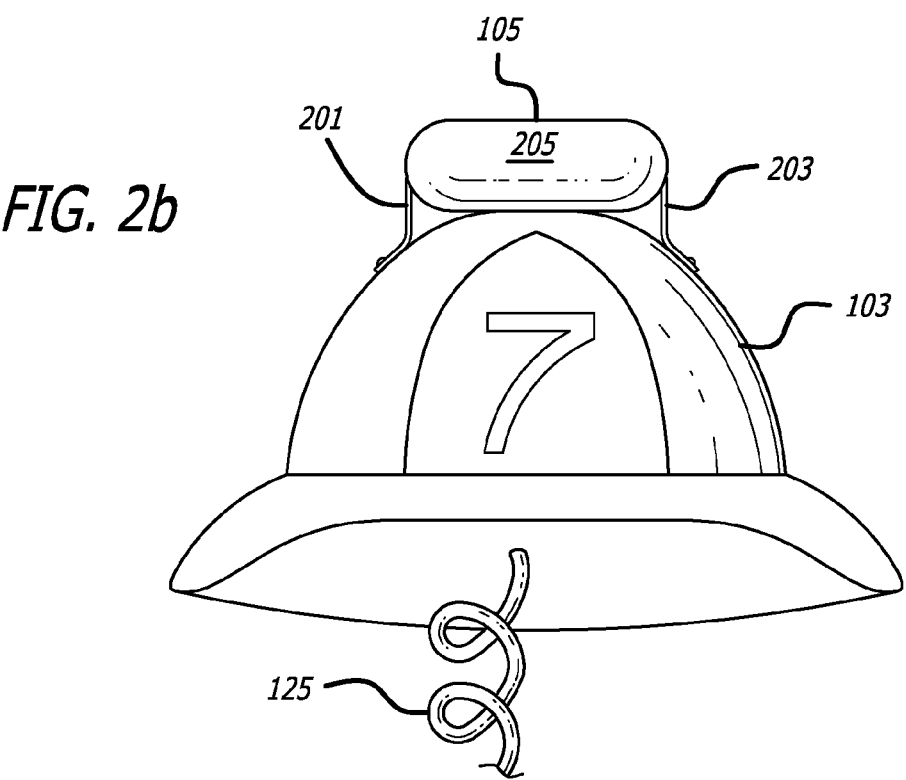

FIGS. 2(a) and (b) illustrate details of the helmet 103 shown in FIG. 1. FIG. 2(a) illustrates a side view, while FIG. 2(b) illustrates a front view. For example, they illustrate attachment mechanisms 201 and 203 that may be used to attach the image sensor 105 to the helmet 103. They also illustrate a radome 205 that the image sensor 105 may have.

Figure 3A:
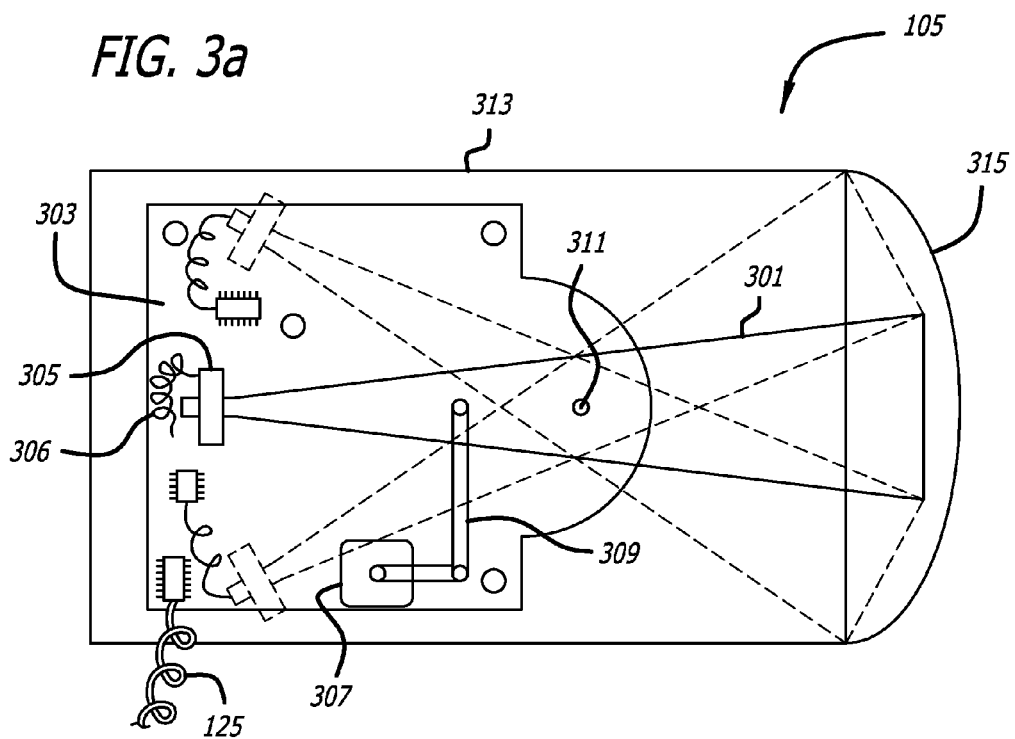
FIGS. 3(a) and (b) illustrate details of a radar sensor that may be used for the image sensor shown in FIG.1
Figure 3B:
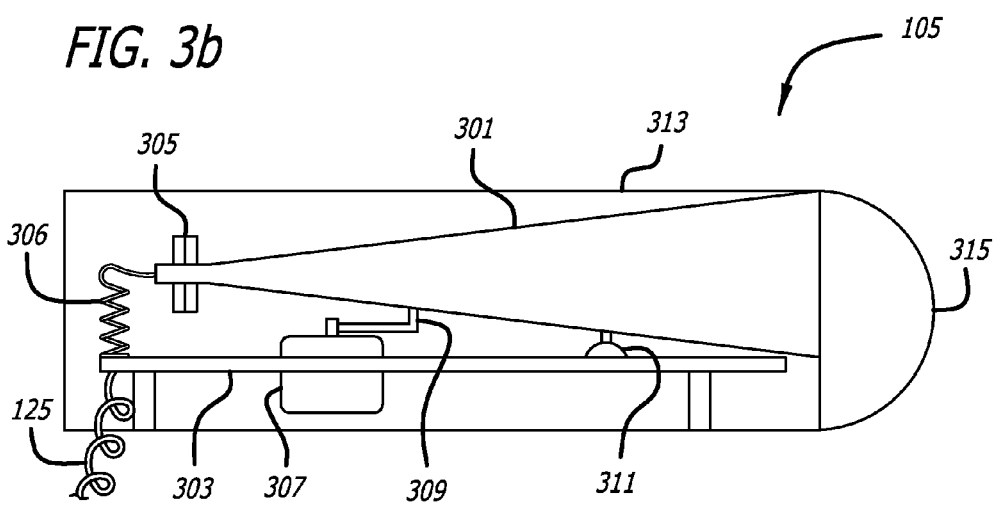

FIGS. 3(a) and (b) illustrate details of a radar sensor that may be used for the image sensor shown in FIG. 1. FIG. 3(a) illustrates a top view, while FIG. 3(b) illustrates a side view. As shown in FIG. 3, the radar sensor may include a beaming antenna 301, a printed circuit board 303 containing electronic circuitry, a sensor module 305, a motor 307, a linkage arm 309, a pivot 311, and a housing 313 that may include a radome 315.

The beaming antenna 301 may be configured to radiate a narrow radar beam. It may be a horn, as illustrated in FIGS. 3(a) and (b), or it may be in any other type of radar antenna, such as a phase array antenna or a frequency scanned antenna.

The printed circuit board 303 may be configured to hold appropriate circuitry configured to perform one or more of the functions that are described herein and/or other functions.

The sensor module 305 may be configured to radiate radar signals and to receive and detect reflected radar signals, as will be described more fully below. The sensor module 305 may be connected to the circuit board 303 with a flexible cable 306. The flexible cable may be coiled, as shown in FIGS. 3(a) and (b), or may otherwise be configured to allow the end of the beaming antenna 301 to be moved with respect to the circuit board 303, without jeopardizing the electrical connection between the two or the movement of the beaming antenna 301.

The motor 307 may be configured along with the linking arm 309 and the pivot 311 so as to cause the beaming antenna 301 to sweep back and forth as shown in FIG. 3(a) in response to appropriate control signals. The motor 307 may be any type of motor, such as a stepping motor. Another type of electro-mechanical device may be used in addition or instead to effectuate scanning of the beaming antenna 301. The antenna may also or instead be scanned electronically using techniques such as phasing, particularly when the beaming antenna 301 is a phased array radar antenna.

The housing 313 may be sized so as to allow the beaming antenna 301 to scan freely. The radome 315 may similarly be configured to allow the beaming antenna 301 to freely scan. The radome 315 may be made of material that allows the radar signal to travel through it without significant degradation or reflection, while at the same time protecting the internal components of the image sensor 105 from external contaminants.

In lieu of the motor 307, the beaming antenna 301 may be scanned using frequency scanning or phasing.

Figure 4:
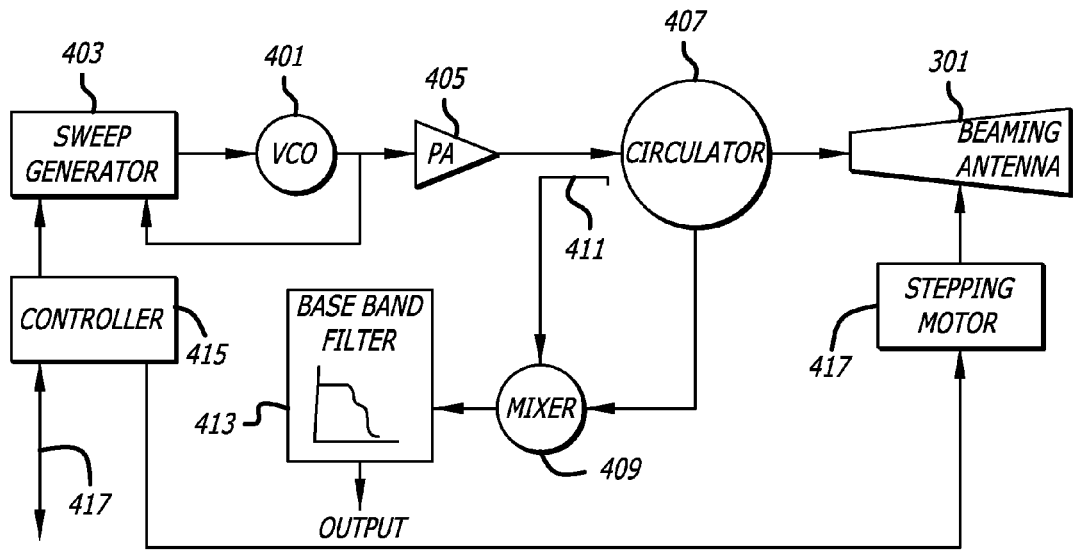
FIG. 4 is a block diagram of the radar sensor shown in FIGS. 3(a) and (b).

FIG. 4 is a block diagram of the radar sensor shown in FIGS. 3(a) and 4. As shown in FIG. 4, a voltage controlled oscillator (VCO) 401 may be used to generate a frequency modulated continuous wave radar signal. The signal may have a wavelength that is less than 1 mm. A frequency of between 30 and 110 GHz may be used, such as a frequency of approximately 76 GHz. The voltage controlled oscillator 401 may be configured to frequency modulate this carrier signal across a bandwidth of between 400 MHz and 1000 MHz, such as across a bandwidth of approximately 500 MHz.

A sweep generator 403 may be used to control the frequency modulation of the radar signal by the voltage controlled oscillator 401. The sweep generator 403 may be configured to generate a saw-tooth or triangular ramp signal that takes between 0.1 ms and 2 ms to ramp fully, e.g., approximately 1 ms. The magnitude of the ramp signal that is generated by the sweep generator 403 may be such as to cause the voltage controlled oscillator 401 to sweep through its full bandwidth.

A power amplifier 405 may be used to amplify the signal from the voltage controlled oscillator 401. The power output of the power amplifier 405 may be between 0.1 mW and 10 mW.

A circulator 407 may be used to direct the frequency modulated continuous wave signal from the power amplifier 405 to the beaming antenna 301.

The objects within the beam from the beaming antenna 301 may each cause a reflection of the beam back to beaming antenna 301. The delay in the arrival of each reflection at the beaming antenna 301 may be indicative of the distance (range) of each object from the beaming antenna 301, while the amplitude of each reflection may be indicative of the radar reflectivity of each object and, in many cases, its size.

These reflected signals may be received by the beaming antenna 301 and redirected by the circulator 407 to a mixer 409. A coupler 411 may simultaneously deliver a sample of the output from the power amplifier 405 to the mixer 409.

The mixer 409 may be configured to multiply the output from the circulator 407 of the reflected signals by the transmitted signal from the coupler 411. This may create a series of tones, namely beat frequencies. The amplitude of each tone may be proportional to the radar cross section (RCS) of an object in front of the beaming antenna 301. The frequency of that tone may be proportional to the distance between the object and the beaming antenna 301. A base band filter 413 may be used to filter limit the noise and enhance these beat frequencies (also known as the base band radar signal) that is outputted from the mixer 409.

A stepping motor 417 may be used to cause the beaming antenna 301 to sweep through an arc, as explained above in more detail in connection with FIGS. 3(a) and (b). A controller 415 may be used to control the stepping motor 407, as well as to control the sweep generator 403. The controller 415 may be configured to cause the stepping motor to quickly move the beaming antenna 301 to its maximum offset position after receiving a command from an input 417 or, in an alternate embodiment, upon its own. The maximum offset may be between 15 and 35° from the antenna's straight-ahead position, such as approximately 25°. Once the beaming antenna 301 reaches this maximum offset position, the controller 415 may then cause the stepping motor 307 to sweep the beaming antenna 301 horizontally from its maximum offset position through its straight-ahead position and to approximately the same offset position in the opposite horizontal direction. This sweeping pattern may then repeat continuously.

The rate at which the beaming antenna 301 horizontally sweeps between its maximum offset positions may vary. In one embodiment, the controller 415 may be configured to cause the stepping motor 307 to sweep the beaming antenna 301 through its entire arc in approximately 1 to 2 seconds.

The controller 415 may cause the stepping motor 307 to sweep the beaming antenna 301 in steps of between 1 and 5°. After each step during a sweep, the controller 415 may be configured to send a triggering signal to the sweep generator 403 so as to cause the sweep generator 403 to initiate its ramp signal. Conversely, the sweep generator 403 may initiate its ramp on its own and send a signal to the controller 415 to begin a sweep. The controller 415 may in any event wait before directing the stepping motor 307 to step to the next position until the ramp that is generated by the sweep generator 403 reaches its maximum value. This may be done in an open or closed loop manner.

The controller 415 may output a synchronization signal over its communication line 417 indicating the commanded position of the beaming antenna 301 and/or the initiation signals to the sweep generator 403. This may assist a processing system (discussed below) in synchronizing the output from the band pass filter 413 with the angular position of the beaming antenna 301.

Figure 5:
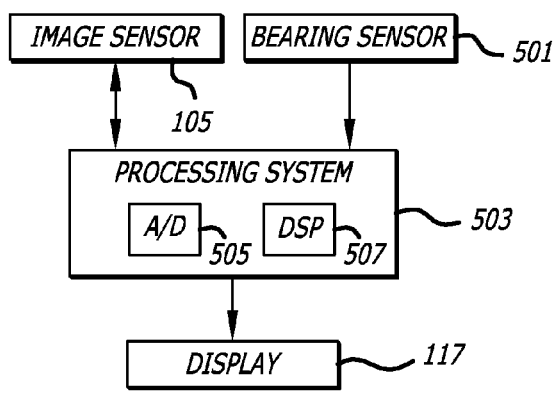
FIG. 5 is a block diagram of the head-mounted navigation system shown in FIG. 1.

FIG. 5 is a block diagram of the head-mounted navigation system shown in FIG. 1. As shown in FIG. 5, the system may include an image sensor 105, a bearing sensor 501 (contained within the housing 107), a display 117, and a processing system 503. The processing system 503 may include an analog-to-digital (A/D) converter 505 and a digital signal processing (DSP) subsystem 507.

The processing system 503 may be configured to receive the image information from the image sensor 105, such as the base band output from the base band filter 413 in the radar sensor shown in FIG. 4. The processing system 503 may utilize the analog-to-digital converter 505 to convert the base band output from the image sensor 105 into a digital signal. The processing system 503 may cause this digital signal to be processed by the digital signal processing subsystem 507 for the purpose of generating display information that is representative of the one or more objects that are within the field of view of the beaming antenna 301 as it is swept across its horizontal arc. This display information may be representative of a three-dimensional image of each of the one or more objects. This display information may be created by the processing system 503 and its associated digital signal processing subsystem 507 using well-established signal processing techniques.

The processing system 503 may classify the objects that are detected within the scanning pathway of the beaming antenna 301 into range bins, such as into 264 or 512 range bins. During the scanning process, the processing system 503 may perform data reduction by statistically classifying the objects and storing them temporarily in a memory (not shown) in accordance with well-known data reduction techniques. At the end of a scan, the data may be retrieved, scaled appropriately, and presented as display information for viewing to the display 117. This entire process may repeat for the succeeding scans.

The processing system 503 may be configured to communicate to the image sensor 105 and, in the embodiment shown in FIG. 4, to the controller 415 of the image sensor, as to when to begin each sweep. Conversely, the image sensor 105 and, in the embodiment shown in FIG. 4, the controller 415, may instead be configured to initiate each sweep on its own and to deliver synchronizing information about that sweep to the processing system 503. Either way, the processing system 503 may be configured to synchronize the received image information from the image sensor 105, which in the embodiment shown in FIG. 4 is the base band output from the base band filter 413, with the position of the beaming antenna 301 as it sweeps horizontally. This may enable the processing system 503 to generate display information that is representative of the cross-range position of each of the one or more objects that are detected by the image sensor 105 for display.

The processing system 503, in conjunction with the digital signal processing subsystem 507, may be configured to distinguish between stationary and moving objects by extrapolating appropriate display information from Doppler frequency shifts in the image information from the image sensor 105, again using well-established techniques. The processing system 503, in conjunction with the digital signal processing subsystem 507, may be configured in addition or instead to generate display information indicative of the temperature of detected objects. This may be accomplished using well-known techniques, such as by extrapolating the temperature information from differences in the noise level of the signal from the image sensor 105.

Figure 7:
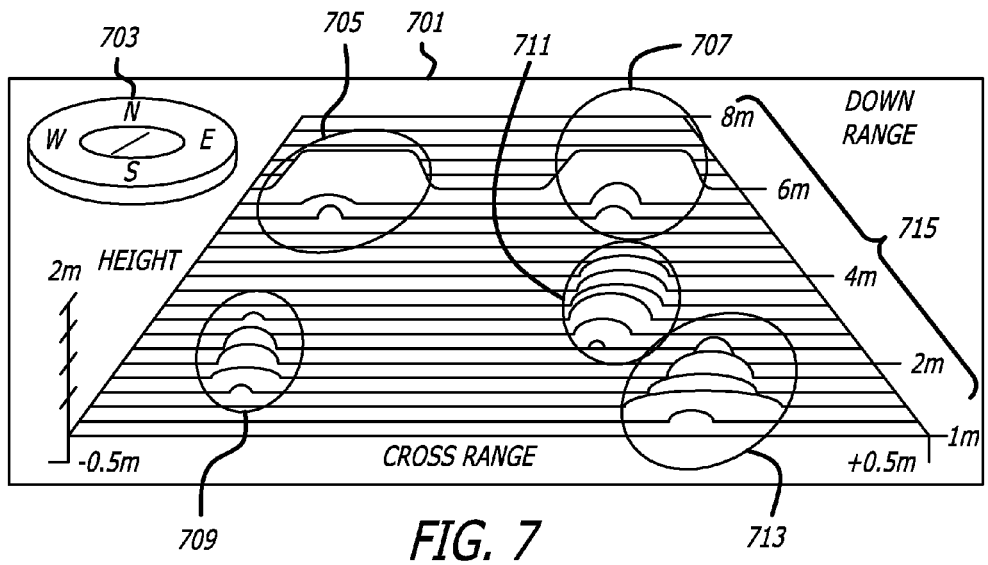
FIG. 7 illustrates images that may be shown on the display in FIG. 1.

The processing system 503 may be configured to generate display information that includes a grid superimposed upon the image information that it generates. The grid information may include coordinate axes and numeric or other appropriate labeling of these axes. An example of such a grid is illustrated in FIG. 7 and discussed below.

The processing system 503 may be configured to also generate display information that is representative of the bearing that is detected by the bearing sensor 501. The display information that is representative of the bearing may take any form. For example, it may take the form of an image of a compass pointing in the direction of the bearing, as illustrated in FIG. 7 and discussed below.

The display information that the processing system 503 generates that is representative of the bearing may be representative of either absolute or relative bearing. When it is representative of absolute bearing, for example, the display information may indicate bearing relative to the four cardinal directions (North, South, East, and West). When the display information is representative of a relative bearing, on the other hand, the display information may indicate bearing relative to a prior bearing.

For example, a firefighter entering a burning room may be more concerned about his bearing relative to a known escape direction, rather than his absolute bearing. Before he enters the room, he may face in the direction of the known escape route and, through actuation of an appropriate user control, cause this bearing to be recorded by the processing system 503. Thereafter, all bearings that are communicated to him through the display 117 may be expressed in a form that is relative to this escape route. In this embodiment, for example, the display information may be representative of an arrow indicating the direction the firefighter must travel to get to this escape route.

When displaying a relative bearing, it may be useful to include a position-monitoring sensor, such as a GPS system, in addition to the bearing sensor. Information from both sensors may then be used by the processing system 503 to more precisely direct the firefighter to preprogrammed locations of interest, such as to an escape route.

A position-monitoring sensor may also be useful in embodiments used to locate something (e.g., a person or article) at a location whose coordinates are precisely known. These coordinates may be preprogrammed in the system. Information from the bearing sensor and the position sensor may then be used in conjunction with this preprogrammed information to again cause the display of an arrow on the display 117 indicating the direction the person must travel to arrive at this predetermined location.

The display 117 may be configured to receive the display information from the processing system 503 and to display visual information representative of the display information. In the embodiment illustrated in FIG. 5, this may consist of visual information representative of one or more objects within the sweeping field of the beaming antenna 301, as well as the bearing of the bearing sensor 501.

The processing system 503 may include hardware, firmware, and/or software, configured in accordance with well-known techniques to implement one or more of the functions that have been described herein. The processing 503 may be dedicated to these functions and/or may be used to perform other functions.

The processing system 503 may be in any location or distributed across multiple locations. In one embodiment, the processing system 503 may be housed along with the bearing sensor 501 in the housing 107. Some or all portions of the processing system 503 may instead be housed in the housing 313 that houses components of the image sensor 105.

The processing system 503 may be configured to communicate with the image sensor 105 and/or the bearing sensor 501 using any type of communication system or protocol. In one embodiment, an RS-232 port may be used.

Although the head-mounted navigation system has thus-far been described as including the image sensor 105, an alternate embodiment may not include any type of image sensor. In this embodiment, the processing system 503 may not have the analog-to-digital converter 505 or the digital signal processing subsystem 507. In this embodiment, the processing system 503 may be configured to generate display information that represents the bearing information, but not objects forward of the user.

Figure 6:
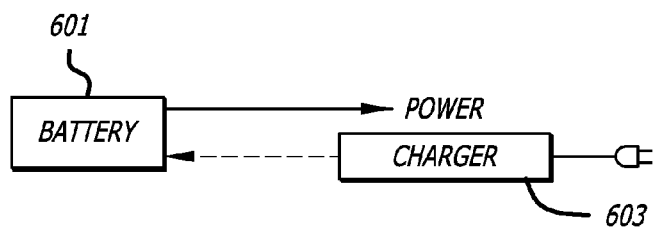
FIG.6 is a block diagram of a power source for the head-mounted navigation system shown in FIG. 1.

FIG. 6 is a block diagram of a power source for the head-mounted navigation system shown in FIG. 1. As shown in FIG. 6, the power source may include a battery 601 and a charger 603.

The battery 601 may consist of more than one battery. The battery 601 may be configured to power all of the electrical components of the head-mounted navigation system, such as the image sensor 105, the bearing sensor 501, the processing system 503, and/or the display 117.

The battery 601 may be of a type that can be recharged. In this instance, the battery 601 may be configured so as to be detachably-connected to the charger 603. When not in use, the charger 603 may be attached to the battery 601 for the purpose of charging the battery 601.

The battery 601 may be located anywhere. In one embodiment, the battery 601 may be located in the housing 107. In an alternate embodiment, the battery 601 may be located in the image sensor 105. The image sensor 105, the bearing sensor 501, the processing system 503, and/or the display 117 may each in addition or instead be powered by their own separate battery, which may be co-located with the device or elsewhere.

FIG. 7 illustrates images that may be shown on the display in FIG. 1. As shown in FIG. 7, the images may include an image of a compass 701 pointing in the direction of the bearing. Instead of having the needle of the compass change orientation to match the bearing, the image of the compass 701 may instead always have the needle point forward, while rotating the relative position of the four cardinal directions to reflect the new bearing. The visual information that is representative of the bearing that is displayed may be dictated by the display information generated by the processing system 503.

The display 701 may also include a three-dimensional wire-frame image of objects that are forward of the user, such as objects 705, 707, 709, 711, and 713. These wire-frame images may be part of the display information generated by the processing system 503. The display 701 may include a superimposed three-dimensional grid pattern 715 as well as axes and numerical scale markings indicating the approximate scale of the imagery. This grid, axes and scale information may be part of the display information generated by the processing system 503.

The head-mounted navigation systems that have now been described may be used in a broad variety of applications.

For example, they may be used in environments in which visibility is poor. The poor visibility may be caused by smoke, dust, fog, snow, sand, rain, flames, darkness, and/or by a combination of one or more of these factors.

Persons in many different types of endeavors may use one or more embodiments of these head-mounted navigation systems to navigate through one or more of these types of problematic environments. For example, a firefighter may use one of these systems in connection with navigating through a room that is filled with flames and/or smoke. The firefighter may use one of these systems to help locate an exit, a person needing to be rescued, and/or to avoid obstacles and/or other dangers.

Figure 8:
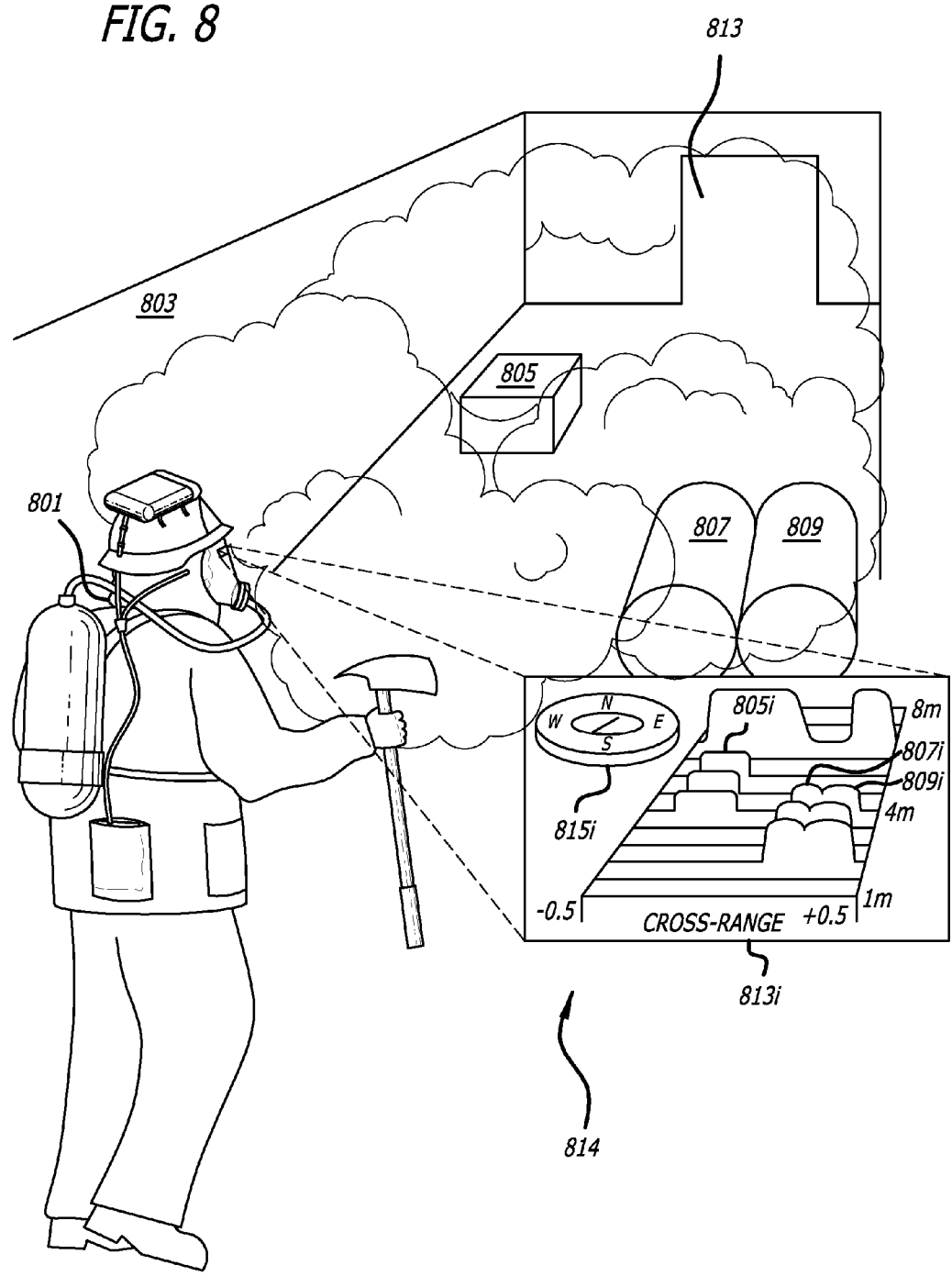
FIG. 8 illustrates a firefighter walking through a smoke-filled room wearing a head-mounted navigation system and a display he sees.

FIG. 8 illustrates a firefighter walking through a smoke-filled room wearing a head-mounted navigation system and a display he sees. Specifically, FIG. 8 illustrates a firefighter 801 wearing a head-mounted navigation system in a smoke-filled room 803. The room includes several obstructions, such as obstructions 805, 807 and 809. It also includes an exit 813.

FIG. 8 also illustrates an enlarged view 814 of what the firefighter 801 may see on the display of his head-mounted navigation system, such as on the display 117 shown in FIG. 1. The image may include an image 815$i$ of a compass pointing in the direction that the firefighter is moving, as well as a three-dimensional wire frame image of the objects 805 (marked 805$i$), 807 (marked 807$i$) and 809 (marked 809$i$), and the exit 813 (marked 813$i$). The firefighter 801 may use the information that he sees on the display 814 to help navigate safely to the exit 813.

Police and military personnel may similarly use one of these head-mounted navigation systems to help locate a hostage in a room filled with smoke from a smoke bomb. The police may in addition or instead seek to use one of these systems to capture or incapacitate a criminal in such a room, while a soldier may similarly use such a system to capture or attack an enemy in such a room. A soldier may also use such a system to help navigate on a smoke-filled battlefield. These are but examples of applications for the head-mounted navigation systems that have been described.

Figure 9:
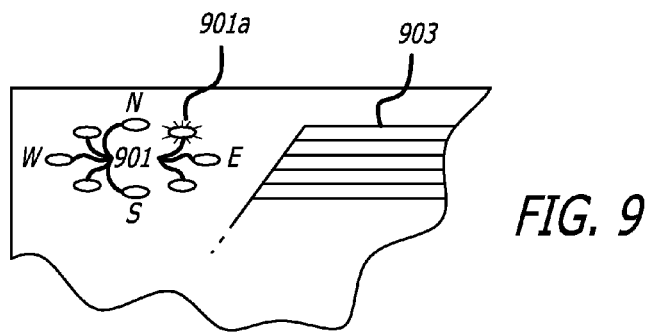
FIG. 9 illustrates a potion of an alternate embodiment of the display in FIG. 1 using LED's.

FIG. 9 illustrates a portion of an alternate embodiment of the display in FIG. 1 using LEDs. As shown in FIG. 9, a set of LEDs 901 may be arranged in a circular pattern around which the four cardinal directions may be displayed. The LED 901$a$ is shown as being illuminated and may correspond to the bearing that has been detected by the bearing sensor.

Although thus-far described as being LEDs, the indicators 901 may, in fact, be integral to the other portions of the display, along with the cardinals, such as integral with the imagery of the grid 903. In this alternate embodiment, LEDs may not be used. Instead, a circular set of virtual LEDs and virtual cardinals may be made to appear as part of a larger LCD display using standard graphics technology.

Figure 10:
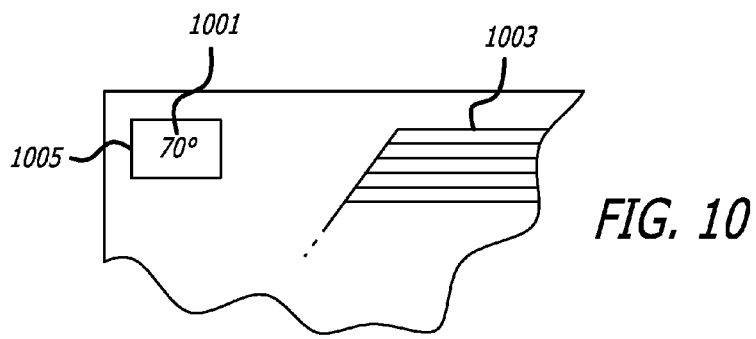
FIG. 10 illustrates a potion of a still further alternate embodiment of the display in FIG. 1 using a numerical representation of bearing.

FIG. 10 illustrates a portion of a still further alternate embodiment of the display in FIG. 1 using a numerical representation of bearing. As shown in FIG. 1, a numerical representation 1001 of bearing may be displayed along with the image grid 1003. The numerical representation 1001 may be presented in a frame 1005. The portion of the display that generates the numerical representation 1001 and/or the frame 1005 may be integral to the portion that generates the grid 1003 (e.g., using a single LCD with standard graphics technology) or may be entirely separate therefrom (e.g., using LED bar segments to make up the numerals and frame).

Figure 11:
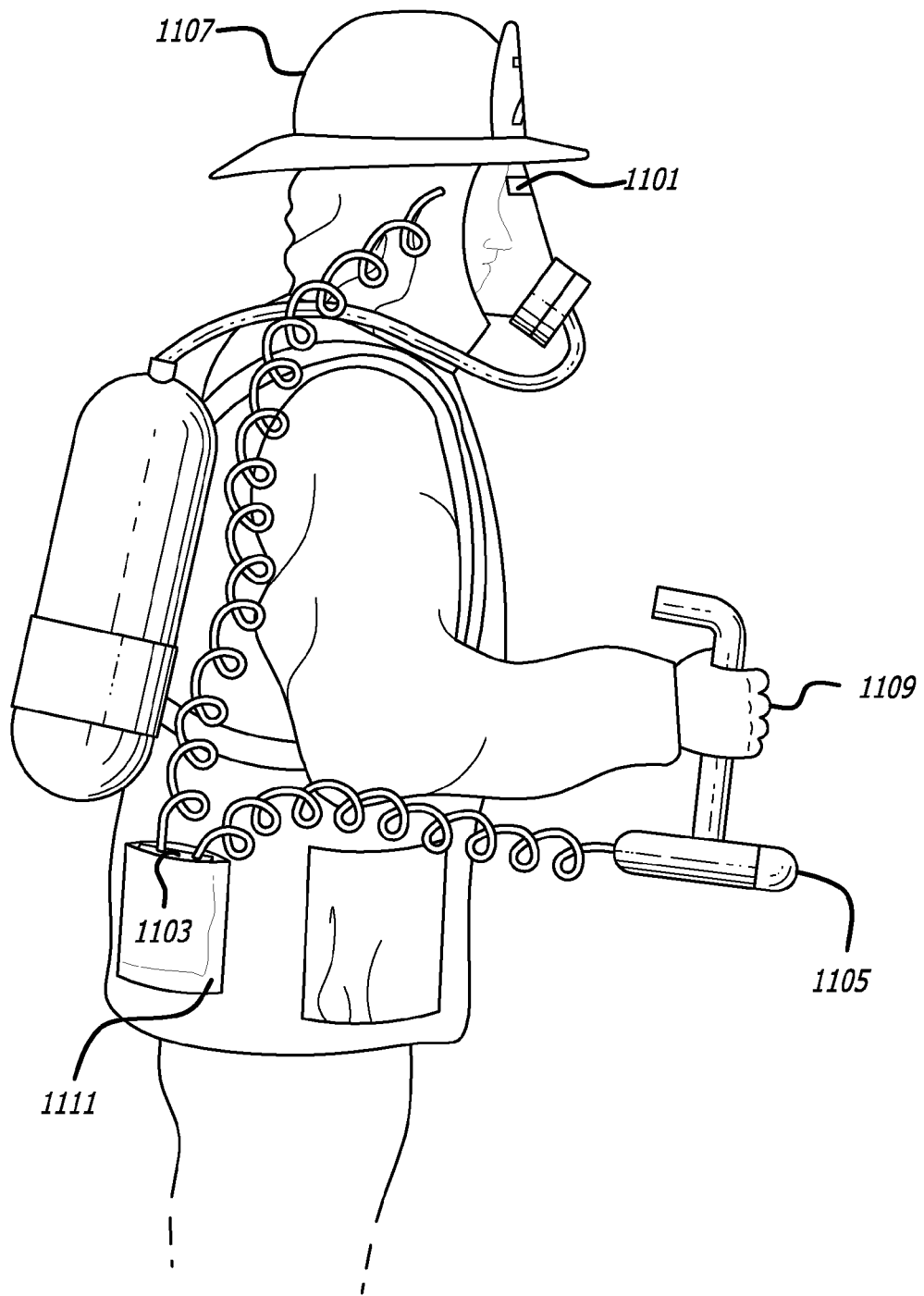
FIG. 11 illustrates an alternate embodiment of a head-mounted navigation system worn by a firefighter.

FIG. 11 illustrates an alternate embodiment of a head-mounted navigation system worn by a firefighter. As shown in FIG. 11, the head-mounted navigation system may include a display 1101, a housing 1103, and a hand-held image sensor 1105. The display 1101, the housing 1103, and/or the image sensor 1105 may be the same as, similar to, or different from the corresponding display 117, the image sensor 105, and the housing 107 discussed above in connection with FIG. 1 and many of the other figures. One difference, for example, may be that the image sensor 1105 may not be attached to a helmet 1107. Instead, it may be configured to be held in a hand 1109 of a firefighter 1111.

The configuration of the image sensor 1105 may vary. For example, the image sensor 1105 may be configured to look more like a flashlight. It may also or instead be configured to be held or attached at a different location, such as in a front pocket of the firefighter 1111.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

For example, sensory devices other than a display may be used instead or in addition. For example, one or more sound transducers may be used to communicate information about objects forward of the user and/or information about the user's bearing. Variations in the frequency of tones, the spacing of tone pulses, and/or the intensity of tones may be used as a means of communicating one or more types of this information. The sound transducer or transducers may in addition or instead be used to deliver verbal communications in a language understood by the user, again to communicate to the user information about his bearing and/or the objects forward of him.

Tactile devices could in a still different embodiment be used in addition or instead, again to communicate information to the user about his or her bearing and/or the objects forward of him or her.

In short, the scope of protection is limited solely by the claims that now follow. That scope is intended to be as broad as is reasonably consistent with the language that is used in the claims and to encompass all structural and functional equivalents. Nothing that has been stated or illustrated is intended to cause a dedication of any component, step, feature, object, benefit, advantage, or equivalent to the public, regardless of whether it is recited in the claims.

The phrase "means for" when used in a claim embraces the corresponding structure and materials that have been described and their equivalents. Similarly, the phrase "step for" when used in a claim embraces the corresponding acts that have been described and their equivalents. The absence of these phrases means that the claim is not limited to any corresponding structures, materials, or acts.

I claim:

1. A head-mounted navigation system, comprising:
    an image sensor configured to sense one or more objects forward of a person and to generate image information representative of the one or more objects;
    a bearing sensor configured to detect bearing and to generate bearing information representative of the bearing;
    securing apparatus configured to secure the bearing sensor to the person;
    a processing system configured to receive the image information and the bearing information and to generate display information representative of the one or more objects and the bearing; and
    head gear configured to mount on the head of the person and to position the display along the sight path of a person.

2. The head-mounted navigation system of claim 1 wherein the image sensor includes a radar sensor.

3. The head-mounted navigation system of claim 2 wherein:
    the head gear includes a helmet; and
    the radar sensor is attached to the helmet and includes a beaming antenna and an antenna sweeping system configured to cause the beaming antenna to sweep horizontally.

4. The head-mounted navigation system of claim 3 wherein the beaming antenna includes a horn and the antenna sweeping system includes a motor mechanically linked to the horn.

5. The head-mounted navigation system of claim 3 wherein the beaming antenna outputs a frequency-modulated continuous wave signal.

6. The head-mounted navigation system of claim 5 wherein the frequency-modulated continuous wave signal has a wavelength of less than one millimeter.

7. The head-mounted navigation system of claim 1 wherein the image sensor is configured to generate image information that is representative of the range and reflectivity of each of the one or more objects.

8. The head-mounted navigation system of claim 1 wherein the bearing sensor includes a magnetic field sensor.

9. The head-mounted navigation system of claim 1 wherein the securing apparatus is configured to secure the bearing sensor to the torso of the person.

10. The head-mounted navigation system of claim 9 wherein the securing apparatus is configured to secure the bearing sensor to the back of a person.

11. The head-mounted navigation system of claim 9 wherein the securing apparatus includes a clothing pocket.

12. The head-mounted navigation system of claim 1 wherein the processing system is configured to generate display information that is representative of a three-dimensional image of the one or more objects.

13. The head-mounted navigation system of claim 1 wherein the processing system is configured to generate bearing information that is representative of an image of a compass pointing in the direction of the bearing.

14. The head-mounted navigation system of claim 1 wherein the processing system is configured to generate bearing information that includes a numerical representation of the bearing.

15. The head-mounted navigation system of claim 1 wherein the processing system is configured to generate bearing information that is representative of the current of the person relative to an earlier bearing of the person.

16. The head-mounted navigation system of claim 1 wherein the display includes an LCD.

17. The head-mounted navigation system of claim 1 wherein the display includes LEDs.

18. The head-mounted navigation system of claim 1 wherein the head gear includes a face mask.

19. The head-mounted navigation system of claim 1 wherein the head gear is configured to position all portions of the display above the horizontal line of sight of the person.

20. A head-mounted navigation system comprising:
a bearing sensor configured to detect bearing and to generate bearing information representative of the bearing;
securing apparatus configured to secure the bearing sensor to the torso of a person;
a processing system configured to receive the bearing information and to generate display information representative of the bearing;
a display configured to receive the display information and to display visual information representative of the bearing; and
head gear configured to mount on the head of the person and to position the display along a sight path of the person,
wherein said bearing sensor includes a magnetic field sensor.

21. The head-mounted navigation system of claim 20 wherein the securing apparatus is configured to secure the bearing sensor to the back of the person.

22. The head-mounted navigation system of claim 20 wherein the securing apparatus includes a clothing pocket.

23. The head-mounted navigation system of claim 20 wherein the processing system is configured to generate bearing information that is representative of an image of a compass pointing in the direction of the bearing.

24. The head-mounted navigation system of claim 20 wherein the processing system is configured to generate bearing information that includes a numerical representation of the bearing.

25. The head-mounted navigation system of claim 20 wherein the processing system is configured to generate bearing information that is representative of the current bearing of the person relative to an earlier bearing of the person.

26. The head-mounted navigation system of claim 20 wherein the display includes an LCD.

27. The head-mounted navigation system of claim 20 wherein the display includes LEDs.

28. The head-mounted navigation system of claim 20 wherein the head gear includes a face mask.

29. The head-mounted navigation system of claim 20 wherein the head gear is configured to position all portions of the display above the horizontal line of sight of the person.

30. A head-mounted navigation system comprising:
an image sensor configured to sense one or more objects forward of a person and to generate image information representative of the one or more objects;
a bearing sensor configured to detect the bearing of the person and to generate bearing information representative of the bearing;
a processing system configured to receive the image information and the bearing information and to generate display information representative of the one or more objects and the bearing; and
a display configured to receive the display information and to display visual information representative of the one or more objects and the bearing.

* * * * *